United States Patent [19]
Le et al.

[11] Patent Number: 5,883,956
[45] Date of Patent: Mar. 16, 1999

[54] DYNAMIC CONFIGURATION OF A SECURE PROCESSING UNIT FOR OPERATIONS IN VARIOUS ENVIRONMENTS

[75] Inventors: An Van Le, Sunnyvale; William B. Sweet, Morgan Hill, both of Calif.; Howard Crompton Herbert, Phoenix, Ariz.

[73] Assignee: National Semiconductor Corporation, Santa Clara, Calif.

[21] Appl. No.: 625,537

[22] Filed: Mar. 28, 1996

[51] Int. Cl.[6] ........................................... H04L 9/00
[52] U.S. Cl. .................................... 380/4; 380/52
[58] Field of Search .................. 380/21, 23, 25, 380/59, 4, 52

[56] References Cited

U.S. PATENT DOCUMENTS

| | | |
|---|---|---|
| 4,621,321 | 11/1986 | Boebert et al. . |
| 4,701,840 | 10/1987 | Boebert et al. . |
| 4,771,462 | 9/1988 | Hannan et al. . |
| 5,164,988 | 11/1992 | Matyas et al. . |
| 5,533,123 | 7/1996 | Force et al. ................................ 380/4 |

*Primary Examiner*—Ronald Biegel
*Assistant Examiner*—Paul D. Amrozowicz
*Attorney, Agent, or Firm*—Limbach & Limbach L.L.P.

[57] ABSTRACT

A technique to dynamically configure a Secure Processing Unit (SPU) chip in a secure manner using a capability table, which defines the functions that an SPU can perform. The capability table employs a digital signature to ensure the authenticity of the source and contents of the table. It also contains information which identifies the SPU for which the table is intended and a time-stamp indicating the time by which the table must be loaded into an SPU.

39 Claims, 2 Drawing Sheets

| BIT OFFSET | CORRESPONDING FUNCTION |
|---|---|
| 0 | GENERATE SPU PUBLIC AND PRIVATE KEY PAIR |
| 1 | ESCROW SPU PRIVATE KEY PAIR |
| 2 | DATA ENCRYPT |
| 3 | DATA DECRYPT |
| ... | . . . |
| n | FUNCTION Xn |

| ENABLING BIT STRING | SPU ID | TIME STAMP | DIGITAL SIGNATURE |
|---|---|---|---|

| ENABLING BIT STRING | SPU ID | TIME STAMP | VALIDATION STRING |
|---|---|---|---| ns in which it is desirable to
DYNAMIC CONFIGURATION OF A SECURE PROCESSING UNIT FOR OPERATIONS IN VARIOUS ENVIRONMENTS

CROSS REFERENCE TO RELATED APPLICATIONS

The present invention is related to commonly assigned U.S. Pat. No. 5,533,123, entitled, "Programmable Distributed Personal Security," issued on Jul. 2, 1996, invented by Gordon Force, Timothy D. Davis, Richard L. Duncan, Thomas N. Norcross, Michael J. Shay, and Timothy A. Short.

FIELD OF INVENTION

This invention relates generally to electronic data processing systems. More specifically, this invention relates to cryptographic techniques for secure data processing and communication.

BACKGROUND OF INVENTION

There are many data processing and communication systems in which information must be processed and transmitted securely. Typically, such systems include one or more integrated circuits designed to securely store and process information. Microprocessors for secure data processing or communication are generally known as Secure Processing Units (SPUs). SPUs typically have a secure memory for storing confidential information such as cryptographic keys, and a "cryptographic engine" for implementing algorithms for encryption and decryption of data and keys. A general treatise describing the use and implementation of data encryption is "A Method for Obtaining Digital Signatures and Public-Key Cryptosystems" by R. Rivest, A. Shamir, and L. Adleman, published in Communications ACM, p. 120, February 1978. Another treatise on cryptography is "Privacy and Authentication: An Introduction to Cryptography" by W. Diffie and M. Hellman, published in the Proceedings of the I.E.E.E. Vol. 67, pps. 397–472 (March 1979).

Depending upon the application and the operating environment, each electronic system may have different security considerations. In certain applications, the security of a system is of such overriding concern that it outweighs the concern for the loss of information. For instance, the identifying key or password that a bank customer uses to access a hardware-based electronic transaction system should not be revealed to anyone under any circumstances even though the information such as the key or password value may be lost in the event of a hardware malfunction. Such a loss of information is not as damaging as having the information stolen. Therefore, the SPUs used in such a system should not allow for the export of the identifying key or password from an SPU.

In contrast, a corporation may not desire such a strict security policy. In the event that an employee is temporarily unavailable or leaves the company, the corporation is concerned that it may not be able to retrieve valuable information contained in the employee's computer system, which is locked with the employee's public key and can be unlocked only with the employee's private key. The corporation may want its employees' private keys to be escrowed (i.e., backed up) by some safe and secure process, so that in an emergency it can open the files that have been locked by its employees. In these situations, the SPUs used must allow for the export of private keys for escrowing purposes. U.S. patent application Ser. No. 08/485,816, entitled "Cryptographic Processor With Multiple Key Pairs For User and Device Authentication," filed on Jun. 7, 1995, invented by William B. Sweet, Howard Crompton Herbert, An Van Le, and Bruce Schneier, is hereby incorporated by reference.

Thus, there are many situations in which it is desirable to use the same SPU design, yet have the flexibility to modify security features in accordance with the requirements of the application and environment. For example, if an SPU is used to process extremely sensitive information, it will be prudent to implement a conservative security "policy", e.g., destroying all confidential data (e.g., keys) inside the integrated circuit upon detection of even a small deviation from the established security parameters from which it should operate. On the other hand, if the information is not very sensitive, and it is not convenient to replace the secure integrated circuit, the security policy could be more lenient, e.g., action could be taken only when there is a large deviation from the established security parameters.

Furthermore, there are instances in which even devices within a single system may have diverging security considerations. For example, in Interactive Television (ITV) applications where multimedia information is distributed over communication networks or over CD-ROMs, an SPU located at a media server will have security considerations different from that of an SPU located at a set-top box or a desktop computer. The media server needs the capability to perform certain cryptographic operations, which should not be available to the set-top boxes for security reasons. For example, a cryptographic function for escrowing keys of an SPU by trusted personnel such as security officers at the media server is necessary for backup purposes, but this escrowing function must not be made available to users of set-top boxes. Set-top boxes are presumed to be located in a hostile environment, where some users may turn out to be adversaries who would try to steal the value of the keys through the use of an escrowing function in order to obtain other unauthorized information. Hence, it is desirable to use an SPU which could be configured to satisfy the security considerations of a variety of devices in a system.

Another need for an SPU which allows for customized configuration occurs in the manufacturing of integrated circuits for export to foreign countries. Due to export restrictions, only SPUs which do not support certain cryptographic operations, such as strong encryption, can be exported outside of North America. Therefore, unless an SPU design which supports reconfiguration is used, chip manufacturers would have to design and manufacture different SPUs depending upon whether it was intended for domestic uses or for export purposes. It is desirable to manufacture a single SPU designed for domestic use, but is also modifiable to satisfy export control requirements. This will reduce the production and inventory cost of SPUs significantly. In other words, it is desirable to design and build a single SPU and be able to modify its security features and functions to satisfy the security requirements of various applications.

Hence, depending upon the application, the security considerations of a system may vary significantly. In turn, the parameters within which the SPU of a system must function also vary significantly. However, SPUs are typically designed or preconfigured to function only within the parameters of the security policy of a system. Many SPUs employ a "hard-wired" architecture, which cannot be reconfigured once they have been manufactured.

One problem with a hard-wired architecture is that it is difficult to produce custom security features for low volume applications. The reason for this is that it takes a considerable amount of time and money to design, test, and fabricate an integrated circuit. Consequently, from an economic standpoint, it is difficult to justify building small quantities of secure integrated circuits, each customized for a special environment.

Another limitation of a hard-wired architecture is that SPUs are designed or preconfigured to perform only those functions specified by the security policy of a system. If the security policy were to change over time, the only way to alter the functions of the SPU would be to redesign, test, and fabricate another integrated circuit to satisfy the new security needs. This is an expensive and time-consuming process.

One approach which allows for customized configuration of an SPU depending upon the application with which it is used is through the use of different tables or vectors in Read-Only-Memory ("ROM") for different SPUs, which can enable or disable cryptographic functions. Under this approach, a manufacturer would program the ROM with firmware that implements a customer's specific security needs. A disadvantage with this method is that it does not offer the flexibility of allowing a system administrator to dynamically reconfigure an SPU once it has been installed in the field.

The need for SPUs which allow for reconfiguration in a secure manner even after a device has been installed in the field is clear in today's networked computing environment. Individual devices on a network often have different security concerns. For instances, some devices may need access to certain sensitive databases while other devices should be prohibited from such access. Hence, devices on a network usually have diverse levels of security requirements. Each device may have different restrictions based on the processing options that it is permitted to perform. Furthermore, as circumstances change, the functions that a device may perform may be expanded or deleted.

Likewise, in the ITV application, dynamic configuration of a device after manufacture is invaluable because new threats often appear in a system. To continue maintaining security, a system often needs the ability to respond to new threats encountered in a system. For example, a user in the ITV application may discover a weakness in the system which allows him to modify billing data in a set-top box to avoid payments to the service provider. Under such circumstances, there is a need for a method to allow the service provider to dynamically disable one or more relevant functions in all of the set-top boxes so that other users cannot further exploit the weakness. Once the function is disabled, the service provider can make arrangements to recall the set-top boxes in an orderly fashion for replacement or upgrading without the fear that the weakness in the system will be further exploited.

Thus, in addition to the need to modify an SPU for specific applications, it is also desirable to develop a technique which allows for dynamic configuration of an SPU even after it has been installed in the field. This is particularly necessary as the operating environment of computing systems change.

The idea of reconfiguring a device or extending capabilities of a device has been used in the area of general purpose computing systems, such as microcomputers. For such systems, a wide range of memory devices may be employed to allow system capability to be reconfigurable. These devices range from PROM to EEPROM. However, such systems typically use a design which gives technically capable users the ability to enable or disable a particular function, or even to upgrade the firmware (e.g., upgrading the BIOS) of certain components. This is not desirable for cryptographic devices which have specific security concerns.

An approach which allows for reconfiguration of a cryptographic device is set forth in U.S. Pat. No. 5,164,988, entitled "Method to Establish and Enforce A Network Cryptographic Security Policy In A Public Key Cryptosystem." The '988 patent describes a method to modify and enforce the security policy of a network through the use of a "configuration vector." Under this approach, the configuration vector, which specifies the functions a device can perform, is loaded into the device on the network. This configuration vector should only be modified by a network manager or certification authority (CA) as the operating environment changes. To enforce the security policy of the system, the CA would perform a random audit on the cryptographic devices on the network from time to time. During this audit process, the CA would typically request the device being audited to send a copy of its configuration vector, digitally signed by a special private key called device authentication key, which is unique to each device. The signing process is performed securely inside the protected boundaries of the cryptographic device. This device authentication key is registered with the CA when the device is installed and initialized. This key cannot be duplicated, and a new key value will be created every time a device is reinitialized. In the event that an adversary attempts to breach the security policy by loading a modified configuration vector to assign unauthorized capabilities to the device, the CA would discover the unauthorized configuration vector when it audits the configuration vector used in the device. During the audit process, the modified vector would be signed by the device authentication key and transmitted to the CA. When the CA receives the modified vector, it will compare the table with the original table assigned to this device and thus detect the modifications. If, at audit time, the adversary attempts to change the unauthorized configuration vector back to the original value assigned by the certification authority, the adversary would have to reload the original vector, which is possible only if the device is reset to an initial state under this approach. However, after resetting the device, a new device authentication key (used to sign the configuration vector before the it is transmitted to the certification facility) will be generated, replacing the original authentication key. The new key would not be recognized by the certification authority. Thus, any attempt to modify the configuration vector would be detected by the CA through an audit.

However, the method described in the '988 patent has at least two disadvantages. First, although the method allows for dynamic configuration, in replacing an existing configuration vector with a new one, it requires a device to be re-initialized, resulting in a major disruption to operations. Second, unauthorized modifications to the configuration vector could be made at anytime and would not be detected until the system administrator performs an audit. By the time the breach of security is detected, significant damage could have already occurred. Thus, the prior art does not offer the security and flexibility required for today's computing environment.

BRIEF SUMMARY OF INVENTION

This invention presents a technique to dynamically configure an SPU in a secure manner as the security needs of a system changes. More specifically, this technique allows a trusted authority such as a system administrator to reconfigure an SPU through the use of digital signature and a capability table, referred herein as capability table, which defines the functions that an SPU can perform. A capability table must be digitally signed by the trusted authority before it can be successfully loaded into the SPU for which the table is intended. Since only an authorized system administrator or certification authority can produce a valid digital signature, no unauthorized person is able to configure an SPU to operate in an unauthorized manner. The digital signature also serves to ensure the integrity of the contents of a capability table.

In other words, digital signatures allow an SPU which needs to be reconfigured to authenticate the identity of the sender of the capability table and to ensure that the capability table has not been tampered with or accidentally altered during transmission. A digital signature for electronic documents plays a role that is analogous to the role played by handwritten signatures for printed documents. Unlike handwritten signatures, however, digital signatures are very difficult to forge and to repudiate.

The process of generating a digital signature on a capability table typically involves the use of a secure hash function. Hashing is a computation applied to a message which transforms it mathematically and reduces it to a unique value called a message digest. The message digest is a concise representation of the longer message or document from which it was derived. Because it is computationally infeasible to come up with two messages that will generate the same value, the message digest is a unique identifier of the document itself, like a digital fingerprint of the larger document.

Under this approach, the certification authority, such as a network administrator who has the authority to configure an SPU, first applies a secure hash function to a capability table to obtain a message digest. The network administrator then encrypts the message digest with his private key (to obtain a digital signature) and sends the signature with the capability table to the intended SPU. The SPU receiving the capability table is now able to verify the digital signature of the network administrator by (a) decrypting the message digest with his public key, which may be sent along with the message in the form of a public-key certificate or securely obtained from a centrally trusted authority; (b) computing a message digest on the capability table, using the same secure hash function employed by the network administrator; and (c) comparing the computed message digest with the decrypted message digest to ensure that they have the same value. The digital signature verification will not succeed if the comparison fails. If a capability table is altered, or if a substitute capability table is sent in place of the original, it can be detected by the SPU receiving the table.

In addition to the feature that permits certain cryptographic functions to be enabled or disabled, this invention includes many other features to permit full flexibility in configuring the SPU. For example, the capability table includes fields to permit a system administrator to specify restrictions on parameters of a cryptographic function (e.g., minimum modulus size of RSA key pairs that are generated or processed by an SPU).

Still another feature of this invention is that it uses countermeasures to ensure that a capability table and the associated valid digital signature for a capability table cannot be re-used at a later time, through the use of digital time-stamping or increasing version numbers.

Yet another feature of this invention is that a capability table intended for one SPU cannot be used with another SPU. This feature is accomplished through the use of a device identification (device ID) field in the capability table, which contains information such as a unique serial number and/or model number. Unless the information contained in the device ID field matches the corresponding information stored in a device's secure memory, the capability table cannot be successfully loaded into that device.

The advantages and objects of the present invention will become apparent to those skilled in the art from the following detailed description of the invention, its preferred embodiments, the accompanying drawings, and the appended claims.

DETAILED DESCRIPTION OF THE INVENTION

Figure 1:
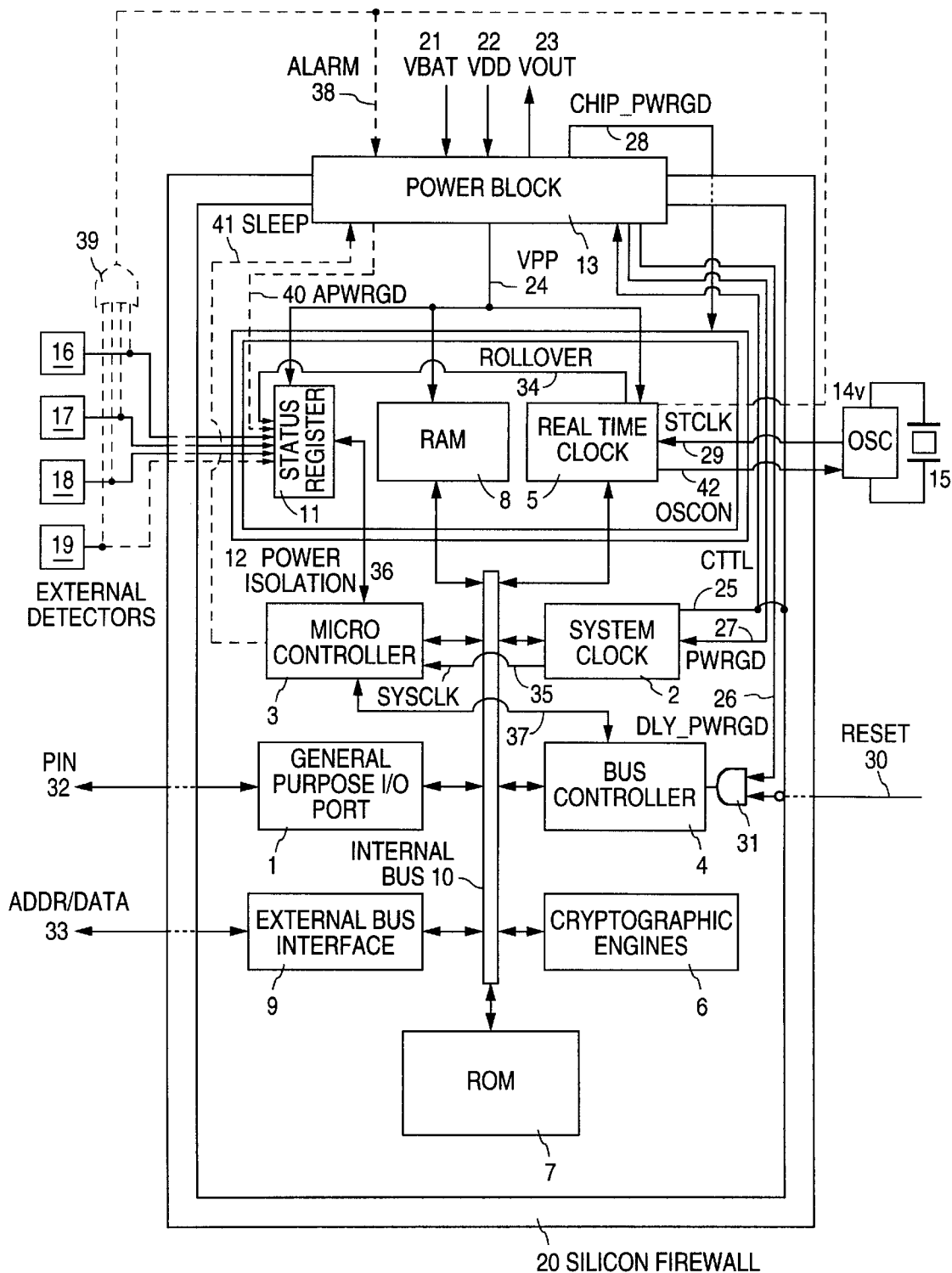
FIG. 1 is a simplified block diagram of a secure processing unit (SPU) in accordance with the present invention.

FIG. 1 describes a typical architecture of an SPU which is suited for implementing the present invention. One suitable type of SPU is that used in the PersonaCard™ 100 security token manufactured by National Semiconductor Corporation, which is disclosed in commonly-owned U.S. Pat. No. 5,533,123, issued on Jul. 2, 1996, entitled "Programmable Distributed Personal Security," 1994, the disclosure of which in its entirety is incorporated herein by reference. This description is not meant to be a literal description of the SPU layout, as some features have been moved or regrouped in order to gain a better conceptual understanding of the principles underlying the present invention.

In this embodiment, the SPU design includes built-in tamper-resistant capability. The SPU's Micro Controller 3 is isolated from all off-chip input—such input regulated by the External Bus Interface Block 9 and the general purpose I/O Port Block 1—instead receiving programmed commands via an Internal Data Bus 10 from the on-board ROM Block 7. In one embodiment, the size of the ROM Block 7 is 64 KBytes whereas the size of the non-volatile RAM Block 8 is 4 to 64 KBytes. The SPU also has firmware routines stored in non-volatile memories such as ROM to support the dynamic loading of a capability table.

The Internal System Bus 10 carries all the major signals among the SPU peripherals, such as the address and data lines, read and write strobes, enable and reset signals, and the Micro Controller clock signal, CTTL 25. The System Clock Block 2 has a programmable internal high-frequency oscillator, and is the source for the Micro Controller clock signal CTTL 25, which governs all peripheral functions.

The Real Time Clock 5 for the SPU follows the IEEE 1212 standard, which specifies control and status register architecture, and which builds upon and significantly enhances the UNIX time format (UNIX time being the number of seconds elapsed since Jan. 1, 1970). Through an offset in non-volatile RAM Block 8, for example, the Real Time Clock 5 provides UNIX time, and can implement a host of time-based functions and time limits under ROM Block 7 program control. One firmware routine stored in the ROM Block 7 cross-checks the System Clock 2 and Real Time Clock 5 so as to overcome tampering with the latter.

The I/O Port Block 1 is a general-purpose programmable input/output interface which can be used to access off-chip RAM, and meet general I/O requirements. Off-chip RAM (not shown) would be typically used for information that cannot be accommodated internally but, for security and performance reasons, still needs to be closer to the SPU than main system memory or disk storage. This information may be protected by modification detection codes, and may or may not be encrypted, depending on application requirements. In addition to serving as a memory interface, several signals on this port can be used to implement cryptographic alarms of trip wire inputs, or even to zero inputs or keys.

The External Bus Interface Block 9 is the communications port to the host system. In one embodiment, it is the means for getting the application commands as well as data to and from the SPU, and is designed to match the ISA bus standard requirements.

A Silicon Firewall 20 protects the internal circuitry from any external asynchronous or otherwise anomalous signals, conditioning the inputs from the I/O Port Block 1 via PIN lines 32 or the External Bus Interface 9 via ADDR/DATA lines 33, the RESET 30 to the Bus Controller 4, as well as from a host of security detectors. Some internally generated signals, such as the output of the Real Time Clock 5, are similarly conditioned.

The Status Register 11 is the repository of all hardware detector signals arrayed through the device to detect various attempted security breaches. Detectors may include a Photo Detector 16, Temperature Detector 17, Metallization Layer Detector 18 and any Additional Detectors 19 (represented in ghost), for example: high/low voltage detectors, vibration detectors, sand detectors.

In one embodiment, Cryptographic Engines Block 6 includes, but not limited to, Data Encryption Standard (DES) algorithms, RSA algorithms, multipliers for public-key operations, and hash accelerators. The Cryptographic Engines 6 receive keys and data for the cryptographic process from the RAM Block 8 under the control of the Micro Controller 3. The data used could be application data supplied from the External Bus Interface 9 or protected data from the RAM Block 8. The Cryptographic Engines Block 6, in one embodiment, performs a decryption of a 64-bit block in 18 clock cycles. Thus, with an SPU rated at 20 MHz, a single decryption will take approximately 90 ns, which amounts to a decryption rate of 8.9 Mbytes per second.

Typically, the SPU receives "messages" in encrypted form. The cryptographic engine 6 is used to encrypt or decrypt the messages, or perform other cryptographic operations as is well-known in the art. In addition to providing secure message transfer, the SPU also provides secure key transfer. By having, or indeed even generating a "master key" internally (using any of the well-known key generation techniques for public or secret key algorithms), the SPU can receive session keys in encrypted form and, treating them like messages, decrypt them with the cryptographic engine using the master key. Conversely, the SPU can encrypt and send messages in a secure manner. The master key, the decrypted session keys and other sensitive information (e.g. the encryption/decryption algorithms) are stored in secure rewritable memory on the SPU.

Figures 2, 3, 4, 5:
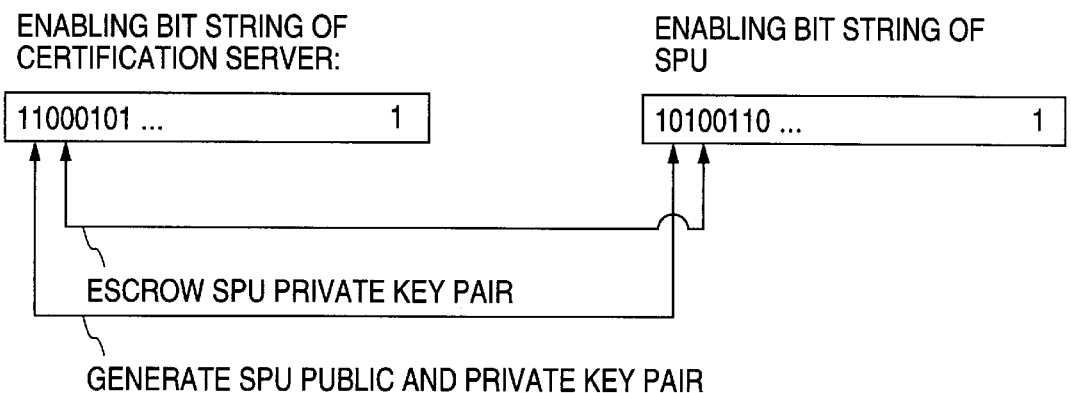
FIG. 2 lists some of the functions typically performed by an SPU.
FIG. 3 illustrates an example of an "enabling bit string" in an external capability table.
FIG. 4 illustrates the data fields of an external capability table.
FIG. 5 illustrates the data fields of an alternative external capability table.

A capability table is, in essence, a positional table or list, consisting of a string of bits, each of which represents a function that an SPU can perform. This string of bits is referred to as an "enabling bit string." For instance, FIG. 2 illustrates some of the cryptographic functions that an SPU can typically perform, including the "Generate SPU Public and Private Key Pair" and "Escrow SPU Private Key" functions. The "Generate SPU Public and Private Key Pair" function generates a pair of RSA public and private keys for an SPU. After the public key has been certified by a certification authority (CA), the key pair can then be used to generate digital signatures, encrypting keys or data for communicating with other SPUs. The "Escrow Private Key" function escrows a private key stored in an SPU for backup purposes. The private key is generally split into several components, each of which is assigned to a single person for safekeeping. This technique is generally known as "secret sharing."

Under this approach, if an SPU is authorized under the security policy of the application to carry out a particular cryptographic function, the value of the bit in the capability table which corresponds to the function is set to "1". On the other hand, if the security policy does not permit the SPU to perform the function, the value of that bit is set to "0".

FIG. 3 depicts an "enabling bit string" of a capability table of an SPU used in set-top boxes and an "enabling bit string" used in certification servers of a content provider in ITV applications. As shown in FIG. 3, "Bit 1" (i.e., the second bit) of the capability table has a value of "0" for the SPU in a set-top box and a value of "1" for the SPU in a certification server. A certification server produces the public key certificates for all public keys of the SPUs that belong to the same ITV network, thereby certifying that these devices are authentic devices and thus authorized to participate in the ITV network. The certification procedure is normally performed in a secure facility of the content provider, under a tightly controlled process, to ensure that unauthorized devices cannot be introduced into the network. When any two devices in the ITV network desire to establish a secure session, each device transmits its own public key certificate to the other device so that the other device can verify its authenticity prior to establishing a secure session. This means that the SPU in the certification server can perform the "Escrow Private Key" function whereas the SPU of the set-top box cannot. This arrangement is necessitated by the difference in security considerations for the two operating environments. The set-top box, which is considered as residing in a hostile environment, must not allow an ITV subscriber to access any part of the key which decrypts the incoming encrypted information. Allowing the SPU to escrow the key for decryption would enable an ITV subscriber to obtain the value of the key or portions thereof, and thus the subscriber may be able to access programs that they have not properly paid for. Disallowing subscribers access to the key for decryption would prevent them from exploiting the system. In contrast, the certification server, which normally resides in a secure facility of a content provider, needs to have the ability to backup its private key by a trusted authority in case the original private key is lost, for example, through a hardware malfunction.

There is a need for an SPU of a certification server to have the capability to backup its private key. Normally, the public key of the certification server is stored in the non-volatile storage (e.g., battery-backed RAM or ROM) of all of the SPUs that belong to a network in order to prevent an adversary from substituting this public key with the adversary's own public key. Such an arrangement forces the adversary to breach the physical security boundary of an SPU in order to compromise its security. However, in the event that the SPU of a certification server loses its private key due to a hardware malfunction, it is desirable to be able to re-install the private key value and other necessary cryptographic variables to another SPU so that the ITV network can continue to operate. Without backing up the private key, another public and private key pair for the certification SPU must be established for use. This means that the new public certification key must be installed into all SPUs that participate in the network. This is a costly process, since either all of the SPUs of the ITV network would have to be recalled, or a secure process to distribute the new public key certificates to the SPUs would necessarily have to be established.

Other commonly used functions include "data encrypt," which is used to encrypt bulk data using the Data Encryption Standard (DES) or any other popular symmetric algorithm. "Data decrypt" is a counterpart of the data encryption function used to decrypt bulk encrypted data.

While a single bit in a capability table typically corresponds to a particular cryptographic function, there are instances where a group of bits would specify the function itself or its operating mode. For example, in FIG. 2, in addition to the first bit which specifies whether or not an SPU can perform the "Generate SPU Public and Private Key Pair" function, the capability table may contain a two-byte field to specify the minimum modulus size of the public and private key that can be generated by this function. That is, if this field has a value of 1024 then the SPU will ensure that the RSA keys that are generated by the "Generate Public and Private Key Pair" function must have a minimum modulus size of 1024.

Furthermore, the capability table may contain fields that apply to more than one function. For example, it may contain an 8-bit field that specifies the allowable length of DES keys that are used in the Data Encrypt and Data Decrypt functions. Due to U.S. export restrictions to cryptographic products, the SPUs that are sold overseas may have this 8-bit field set to a value of 40, to indicate that for these SPUs, the length of the DES keys used in the Data Encrypt and Data Decrypt functions must not exceed 40 bits. On the other hand, for SPUs used in North America, this 8-bit field may be set to higher values (e.g., 56, 112, 168) to indicate whether or not DES keys with a single 56-bit part, two distinct 56-bit parts (ANSI X9.17), or three distinct 56-bit parts (Merkle & Hellman scheme) must be used in the Data Encrypt and Data Decrypt functions. A description of the various DES encryption methods can be found in "American National Standard X9.17-1985, American National Standard for Financial Institution Key Management," American Bankers Association, Washington, 1985 and "On the Security of Multiple Encryptions," by Merkle and Hellman, Communications of the ACM, July 1981. Alternatively, a cryptographic system designer may allocate two 8-byte fields, where each field specifies the required key length for each Data Encrypt and Data Decrypt function. One skilled in the art would appreciate that there are a variety of possibilities to assign a capability to an SPU through the grouping of bits and fields of a capability table.

In this embodiment, in order to successfully load a capability table into an SPU, the capability table must have a digital signature of the appropriate authority. First, a trusted authority such as a system administrator sets up capability tables for all SPUs on a system in accordance with its security policy. Assume that there are "N" SPUs and "M" classes of devices on a network. The SPUs are classified by the role and functions performed by their devices. In such a system, "M" is smaller than or equal to "N" (i.e., M≦N). Of course, there are applications where each device has a unique role in the system, and thus the number of classes of devices is the same as the number of devices (i.e., M=N). In any event, the trusted authority or system administrator initially prepares M capability tables for the M classes of devices. As stated previously, the value of each bit in the capability tables is assigned based upon the role of the individual device or class of devices.

After creating the classes of capability tables, each individual device on the network is assigned a capability table based on its role in the system. Next, the trusted authority appends a time-stamp and a device ID field to the capability table to obtain an intermediate capability table for each SPU. Consequently, a total of N capability tables will be constructed.

The rationale behind incorporating a time-stamp is to prevent unauthorized re-use of a capability table. The device ID is incorporated to ensure that only the intended SPU could load the capability table. The trusted authority then produces a digital signature on each individual capability table by signing the table with its private certification key. Afterwards, the digital signature is appended to the intermediate capability table. The resulting data structure is referred to as an external capability table.

FIG. 4 illustrates typical data fields of an external capability table. In FIG. 4, the "enabling bit string" represents the bit string which enables or disables various cryptographic functions supported by an SPU, as discussed previously.

The digital signature in FIG. 4 must be produced in a secure manner to prevent unauthorized signing of the capability table. One approach is that the certification authority may set up one or more workstations dedicated to producing the external capability tables for the SPUs. These dedicated workstations support a special function, referred herein as the signing function, for producing the digital signature on external capability tables. The signing function and the private certification key can be implemented either in software or hardware. If physical access to the signing workstation is well-controlled, a software implementation may be adequate. However, a hardware implementation, which uses a private certification key stored in secure memory for signing, is more secure. In other words, it is less likely that the value of a private certification key would be compromised. If the network administrator has his own PCMCIA security token, then access control may not even be necessary. On the other hand, in a software-based implementation, the key for signing information will be in the clear at some point. Therefore, any software-based solution faces a possibility that the keys can be accessed and stolen.

After the certification authority has signed the capability tables, the signed external capability tables are then transmitted to the appropriate SPUs for loading. The loading of the external capability table to an SPU can be performed as part of the initialization of the SPU while the SPU is at a secure facility of the manufacturer, or can be performed dynamically while the SPU is in the field. If the loading of the signed external capability table to an SPU is performed at a secure facility of the manufacturer, then time-stamping may not be necessary. Otherwise, if the loading is to be performed dynamically while the SPU is in the field (e.g., in a customer's home), then time-stamping must be used, and the signed external capability table must be transmitted and loaded within a specific pre-determined time period. In this embodiment, the secure memory of the SPU contains certain pre-loading information, without which a capability table cannot be loaded. The information includes device identification information such as serial number and the public key that corresponds to the private certification key of the trusted authority who produces the digital signature on the capability table. This public key is referred to as the public certification key, which must be installed in the SPU through a secure means. An adversary must not be able to install his own public certification key to an SPU and then subsequently load an unauthorized external capability table, signed with his own private certification key, into the SPU.

In the preferred embodiment, the public certification key is part of the code residing in the on-chip secure Read Only Memory (ROM), so that the adversary could not change its value without defeating the physical security of the SPU to replace the ROM code. If, for some reasons, the public certification key cannot be stored in the ROM, the SPU is designed such that the key is installed at the manufacturer's or network administrator's secure facility when the device is initialized and cannot be changed thereafter unless the SPU is reset through a secure and authorized process. Resetting the SPU would clear the values of all cryptographic keys and variables inside the SPU, and the SPUs must be re-initialized by the manufacturer or network administrator. Unlike the public certification key, the device ID information of an SPU need not be stored as part of the ROM code. Instead, it can be stored on the non-volatile RAM residing inside the firewall of an SPU. However, like the public certification key, the device ID information must be loaded through a secure means and cannot be changed unless the SPU is reset. The purpose of this procedure is to prevent an adversary from setting the device ID information in an SPU to the same value as the information contained in the device ID field of a legitimate external capability table transmitted to an intended SPU but intercepted by the adversary.

The process for loading an external capability table generally involves several steps. Upon receiving an external capability table, the host software of the computer that houses the SPU invokes a function, referred herein as the "Load Capability Table" function to load the external capability table into the SPU. The "Load Capability Table" function generally performs the following steps:

First, the function extracts the device ID field from an external capability table and then compares it to the device ID information stored in the SPU's secure memory. If the two values do not match, the function records the type of error for later reporting to the certification facility and rejects the new external capability table.

Second, the function then extracts the time-stamp field from the external capability list and then compares it with the current clock value of the SPU. The comparison takes into consideration the delay for the capability table to reach the intended SPU as well as other clock tolerance factors such as clock drift. If the comparison results in a time-stamp difference larger than specified, the function records the error type for later reporting to the certification facility and rejects the external capability table.

Third, the function verifies the digital signatures in the external capability table using the public certification key stored in the SPU's secure memory. This task consists of (i) decrypting the digital signature with the public certification key to obtain a referenced hash value; (ii) computing a hash value on the "enabling bit string," the device ID of the SPU, and the time-stamp, using a secure hash function such as MD5, to obtain another hash value; and (iii) comparing the computed hash value with the referenced hash value. If the two values match, the digital signature is successfully verified. Of course, the decryption process in step (i) includes verification of decrypted data to ensure that it contains valid information. Those skilled in the art will appreciate that these verifications are necessary to ensure that the result obtained from decrypting the digital signature in step (iii) is valid. For example, if the algorithm generating digital signature follows that of the Public Key Cryptography Standard #1 (PKCS #1), then the verifications on the decrypted value must follow those defined in the standard. Detail of these verifications can be found in "Public Key Cryptography Standards," RSA Laboratory, Nov. 1, 1993.

Fourth, after the digital signature has been verified, the function extracts the "enabling bit string" from the external capability table and stores it in non-volatile RAM inside the SPU. If there exists a current capability table in the SPU's non-volatile RAM, the value of the new capability table would simply overwrite the value of the current capability table. Although the device ID and the time-stamp may also be loaded together with the "enabling bit string," it is not required. They are useful only for verifying the validity of the external capability table prior to loading it. The "enabling bit string" that is loaded in the SPU becomes the new capability table which governs the functions that an SPU can perform.

Another approach is to use an increasing version number instead of using a time-stamp. Every time a new capability table is prepared for an SPU or a class of SPUs, a new version number, which equals the previous version number plus one, is assigned to the new capability table and used in the digital signature generation for the external capability table. The SPU for which the capability table is intended checks the version number of the new capability table as part of the execution of the Load Capability Table function, to ensure that the version number of the new capability table is greater than the version number of the current capability table by 1. The current version number is stored in non-volatile storage of the SPU. The new capability table will be rejected if its version number is smaller than or equal to the version number of the existing capability table. If there is no existing capability table (i.e., the new capability table is loaded for the first time), the SPU will check to ensure that the version number of the new capability table is 1. Unlike the time-stamp, which is not required to be stored inside the SPU, once the validation of the new capability table is successful, the version number must be stored together with the new capability table in the SPU's non-volatile RAM, for use in future validation of new capability tables.

The process of transmitting an external capability table to an SPU as well as the process of receiving and loading a capability table into an SPU can be automated without requiring human intervention. However, if a user or a security officer assigned to manage a device attempts to exploit the system, the person could potentially intervene to prevent a capability table from being loaded. Of course, if a capability table has never been loaded into the SPU, the adversary would have no choice but to allow the transmitted capability table to be loaded into the SPU, otherwise the SPU would not be operational. However, once the capability table has been loaded and the SPU is operational, the adversary may attempt to interfere with the loading of a capability table which would be transmitted in the future, particularly if the next capability table is more restrictive than the current capability table, thereby limiting the functions that the adversary can execute. In other words, it is conceivable that the adversary would resist loading a more restrictive capability table because it would limit its access to the system.

To deter an adversary from preventing a capability table from being loaded into an SPU, the preferred embodiment includes an optional post-loading process. In the Load Capability Table function, after loading the capability table, the SPU will set the value of a field, called Time Last Capability Table Loaded (TLCTL) in its non-volatile storage to the value of its real-time clock. The TLCTL field is used by the SPU to keep track of the time elapsed since the last capability table was loaded into the SPU. If this time exceeds the value of another field, called Capability Table Time-out (CTTO), then the current capability table has expired. An SPU with an expired capability table will not carry out most cryptographic functions, except the Load Capability Table function, which is required to load a new capability table into the SPU. The Capability Table Time-out field is also stored in the capability table as a field associated with the Load Capability Table function. Thus, when the current capability table has expired, the adversary essentially has little choice but to allow a new capability table to be loaded. Otherwise, the SPU will be inoperable.

In addition to setting the value of the Time Last Capability Table Loaded field, the SPU may also produce a digital signature on the loaded capability table, using its own private key. This signed capability table is then returned to the network administrator, as a confirmation that the transmitted capability table has been loaded into the intended SPU. The process of signing the loaded capability table is part of the integrated execution of the Load Capability Table function.

In order to make the process more secure, at the SPU that loads a capability table, the private key for signing the capability table should generally be different from the private key used for generating signatures for other types of communications. Also, the process of signing the loaded capability table should be part of the integrated execution of the Load Capability Table function, and the private key for signing a capability table should not be available in a general purpose signature generation function. In other words, one should not be able to use the private key that is intended for signing a capability table to sign any data other than a capability table. Otherwise, an adversary at the receiving SPU may be able to generate a digital signature on the received capability table using a general purpose signature generation function along with the private key for signing capability tables, and mislead the network administrator into believing that the transmitted capability table has been loaded into the intended SPU.

Once the capability table is loaded, and other required cryptovariables are initialized in the SPU, the SPU transits to an operational state where it can carry out useful cryptographic operations. From that point on, any time an SPU executes a cryptographic function, it will verify through the capability table that (a) the function is enabled, and (b) the elapse time since the last capability table is loaded (i.e., the difference between the current value of the real time clock and the value of the field Time Last Capability Table Loaded) does not exceed the value of the Capability Table Time-Out field. If any of the above two verifications is not successful, the SPU aborts the execution of the function except under certain circumstances, described as follows. For the Load Capability Table function, the verifications will not be performed to prevent a lockout. Similarly, if there are other functions that must be performed to initialize other cryptovariables of the SPU before the SPU can reach an operational state, the above aforementioned verification steps will also be ignored for these functions.

In addition to signing the capability table, if the network administrator desires to maintain the privacy of the capability table and any additional information to be loaded via the Load Capability Table, the administrator can encrypt the capability table and any additional information under the public key of the receiving SPU. The encrypted information value can then only be decrypted through the Load Capability Table function at the receiving SPU, using the receiving SPU's private key.

In an alternate embodiment of this invention, instead of signing the capability table, the network administrator may encrypt the capability table and additional information with ones private key, also known as the private certification key. In this case, the external capability table comprises of a bit string that represents the encrypted value of the concatenation of the fields shown in FIG. 5. Under this approach, there is no digital signature in the external capability table. The operation of the Load Capability Table function in this case is similar to that of the preferred embodiment. However, instead of verifying the digital signature on the external capability table, the SPU decrypts the external capability table with the corresponding public key, also known as the public certification key, to recover the clear value of the capability table and other information. As in the preferred embodiment, the public certification key is stored in the SPU's Read Only Memory (ROM), to prevent unauthorized substitution or modification. Prior to loading the recovered value of the capability table, the time-stamp, and other information, the SPU validates the decrypted value to ensure that spurious results would not be accepted. The validation string shown in FIG. 5 is used to further strengthen the verification process. In addition to standard verifications (e.g., those defined in the Public Key Cryptography Standard #1, PKCS #1), the SPU also verifies that the recovered validation string matches that of a predefined value. Generally, the length of the validation string is restricted by one or more conditions imposed on the total length of the information to be encrypted, and depends on the public-key encryption algorithm that is used. For example, in the encryption algorithm defined by PKCS #1, the total length of the information to be encrypted, in bits, must be less than the modulus length of the RSA private key subtracted by 88 bits. Such a limitation allows for the interleaving of data to be encrypted with a minimum of required padding bits and other predefined quantities, to deter a number of known attacks on RSA encryption methods.

It can be argued that since the public key of the network administrator or the certification authority, referred herein as the public certification key, is often made public, the encrypted value of the capability table and other information can be readily decrypted. Thus, there is little value in encrypting them. However, there are applications where the public keys are encrypted (e.g., under a DES key), or kept private, for a number of reasons. See e.g., D. W. Davies and W. L. Price, *Security for Computer Networks,* second edition, John Wiley and Sons, New York, 1989. In such applications, the value of the capability table and other information can be kept private, as the public certification key is kept private. Regardless of whether the capability table and other information can be kept private, once the information has been correctly recovered at the receiving SPU, its authenticity is assured, as its encrypted value can be produced only by the holder of the private certification key.

Still, in another embodiment of this invention, where there is no capability for producing and verifying digital signatures, symmetric cryptographic algorithms can be used to authenticate the capability table. In this embodiment, the external capability table is similar to that of FIG. 4, except that the digital signature is replaced by a cryptographic quantity called Message Authentication Code (MAC). A Message Authentication Code, also known as Data Authentication Code (DAC), is a cryptographic checksum computed on the data to be transmitted, using a secret symmetric key (e.g., a DES key), to ensure the integrity of transmitted data. A widely used DES-based MAC algorithm is the one published in the American National Standard, X9.9, "American National Standard for Financial Institution, Message Authentication (Wholesale)," American Banker Association, Washington, D.C., 1986.

In this embodiment, the certification authority first establishes a secure communication session with the SPU for which the capability table is intended, through the use of well-known and secure key exchange protocols. Through the protocols for establishing a secure session, the two SPUs now share a common session key, such as a secret DES secret key. The certification authority then uses the secret DES key to generate a MAC on the external capability table and, in turn, transmits the external capability table as well as the MAC to the intended SPU. Since the session key is valid only for the duration of the session, only the intended SPU can successfully verify the MAC produced using the external capability table. Once the MAC has been successfully verified, the capability table is loaded into the SPU's non-volatile storage.

Under this approach, care must be exercised in the use of symmetric keys to generate and validate the external capability tables because the symmetric keys are shared between the two communicating parties. For instance, a system which is not well-designed may allow an adversary at the receiving SPU to use the secret key in conjunction with a general purpose MAC generation function to produce a MAC on an unauthorized capability table and then feed the result to the Load Capability Table function for acceptance. A well-designed system should generally limit the functions with which the secret key can be used. For instance, the adversary should not be able to generate a MAC on an unauthorized capability table using the secret key and a general purpose MAC generation function. Otherwise, since the MAC on the external capability table will be verified correctly with the same shared secret DES key, the capability table produced by the adversary will be accepted by the SPU (via the Load Capability Table function). The security of the system can be compromised even if the adversary does not know the value of the secret key.

One method to prevent this problem is to have two session keys established for every establishment of a secure session. The first session key is used for general purpose encryption and/or authentication (via MACs) of general data exchanged during the session. The second session key is used solely for the generation and verification of capability tables. As such, the first key can be used in a general-purpose MAC generation function to authenticate regular transmitted data. However, the second session key can be only used at the receiving SPU only as an integral part of the Load Capability Table function, for verifying the MAC on the external capability table. To minimize potential misuse, the general purpose MAC generation function should be designed in such a way that the second key cannot be used to generate a MAC using the function.

As in the preferred embodiment, an increasing version number for a capability table can be used instead of a time-stamp. Under this approach, the ID field and the time-stamp (or version number) may not be required in the external capability table. This is because the SPU ID is normally involved in a secure session establishment, and a secure session is established only if the two communicating parties are able to mutually authenticate each other's identity. Thus, once a secure session is successfully established, the SPU ID is not necessary for verification of the capability table. Also, a secure session is normally established within a particular specified time frame thus preventing the reuse of old information such as a capability table. Reusing of capability tables transmitted in previous sessions would not be feasible, as new session key(s) is created and used for each new session. Thus, the time-stamp may also be unnecessary under this approach.

The above description is illustrative and not restrictive. Many variations of the invention will become apparent to those of skill in the art upon review of the disclosure. The scope of the invention should, therefore, be determined not with reference to the above description, but instead should be determined with reference to the appended claims along with their full scope of equivalents.

We claim:

1. A data structure for a cryptographically secure processing unit (SPU) stored in a computer readable memory comprising:

a capability table specifying functions that can be executed by said SPU;

a first field related to a time period for which said table is valid; and a second field authenticating said capability table and said first field.

2. The data structure of claim 1 wherein said first field comprises a time-stamp.

3. The data structure of claim 1 wherein said first field comprises a version number corresponding to a current version of said capability table.

4. The data structure of claim 1 wherein said second field comprises a digital signature produced by a trusted authority.

5. The data structure of claim 1 wherein said second field comprises a data string chosen by a trusted authority.

6. The data structure of claim 1 wherein said second field comprises an authentication code generated from said capability table and said first field.

7. The SPU of claim 1 wherein said SPU comprises a single integrated circuit device.

8. The data structure of claim 1 wherein said SPU is an element of a system comprising a plurality of electronic devices.

9. A data structure for a cryptographically secure processing unit (SPU) stored in a computer readable memory comprising:

a capability table specifying functions that can be executed by said SPU;

a first field identifying said SPU;

a second field related to a time period for which said table is valid; and a third field authenticating the source and content of said capability table, said first field, and said second field.

10. The data structure of claim 9 wherein said second field comprises a time-stamp.

11. The data structure of claim 9 wherein said second field comprises a version number corresponding to a current version of said capability table.

12. The data structure of claim 9 wherein said third field comprises a digital signature produced by a trusted authority.

13. The data structure of claim 9 wherein said third field comprises a data string chosen by a trusted authority.

14. The data structure of claim 9 wherein said third field comprises an authentication code generated from said capability table, said first field and said second field.

15. The data structure of claim 9 wherein said first field contains information which uniquely identifies said SPU.

16. The data structure of claim 15 wherein said information is the serial number of said SPU.

17. The SPU of claim 9 wherein said SPU comprises a single integrated circuit.

18. The data structure of claim 9 wherein said SPU is an element of a system comprising a plurality of electronic devices.

19. A method of configuring a cryptographically secure processing unit (SPU) comprising the steps of:

(a) encoding a security policy for said SPU in a capability table stored in a computer readable memory;

(b) appending to said table a first field related to a time period for which said table is valid;

(c) appending to said table a second field authenticating the source and content of said table; and (d) transmitting said table and said appended fields to said SPU.

20. The method of claim 19 wherein said first field comprises a time-stamp.

21. The method of claim 19 wherein said first field comprises a version number corresponding to a current version of said capability table.

22. The method of claim 19 wherein said authentication field comprises a digital signature produced by a trusted authority.

23. The method of claim 19 wherein said second field comprises a data string chosen by a trusted authority.

24. The method of claim 19 wherein said second field comprises an authentication code generated from said capability table.

25. The method of claim 19, comprising the further step of:

checking a function to be executed against said capability table to verify that said function is enabled before said function can be executed.

26. The method of claim 19 wherein said SPU is an element of a system comprising a plurality of electronic devices.

27. A method of configuring a cryptographically secure processing unit (SPU) comprising the steps of:

(a) encoding a security policy for said SPU in a capability table stored in a computer readable memory;

(b) appending to said table a first field identifying said table;

(c) appending to said table a second field related to a time period for which said table is valid;

(d) appending to said table a third field authenticating the source and content of said table; and (e) transmitting said table and said appended fields to said SPU.

28. The method of claim 27 wherein said first field contains information which uniquely identifies said SPU.

29. The method of claim 28 wherein said information is the serial number of said SPU.

30. The method of claim 27 wherein said second field comprises a time-stamp.

31. The method of claim 27 wherein said second field comprises a version number corresponding to a current version of said capability table.

32. The method of claim 27 wherein said third field comprises a digital signature produced by a trusted authority.

33. The method of claim 27 wherein said third field comprises a data string chosen by a trusted authority.

34. The method of claim 27 wherein said third field comprises an authentication code generated from said capability table.

35. The method of claim 27, comprising the further steps of:

(a) receiving said table and said appended fields in said SPU;

(b) verifying said first field and third field;

(c) comparing said second field with the clock value of said SPU; and (d) loading said table in a secure memory of said SPU.

36. The method of claim 35, comprising the further step of:

checking a function to be executed against said capability table to verify that said function is enabled before said the function can be executed.

37. The method of claim 27, comprising the further steps of:

(a) receiving said table and said appended fields in said SPU;

(b) verifying said first field and third field;

(c) comparing said second field with a value stored in said SPU; and (d) loading said table in a secure memory of said SPU.

38. The method of claim 37, comprising the further step of:

checking a function to be executed against said capability table to verify that said function is enabled before said the function can be executed.

39. The method of claim 27 wherein said SPU is an element of a system comprising a plurality of electronic devices.

* * * * *